(12) United States Patent
Konda et al.

(10) Patent No.: US 7,065,604 B2
(45) Date of Patent: Jun. 20, 2006

(54) INTERFACE MODULE FOR TRANSMITTING DIGITAL VIDEO SIGNAL

(75) Inventors: Hideya Konda, Osaka (JP); Kazuki Sogabe, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 192 days.

(21) Appl. No.: 10/761,306

(22) Filed: Jan. 22, 2004

(65) Prior Publication Data

US 2004/0158662 A1 Aug. 12, 2004

(30) Foreign Application Priority Data

Feb. 10, 2003 (JP) ............................. 2003-032324

(51) Int. Cl.
*G06F 13/00* (2006.01)
*G06F 13/12* (2006.01)

(52) U.S. Cl. .................. 710/315; 710/100; 710/72

(58) Field of Classification Search ................ None
See application file for complete search history.

(56) References Cited

U.S. PATENT DOCUMENTS

| | | | |
|---|---|---|---|
| 4,262,641 A * | 4/1981 | Mosely et al. | 123/335 |
| 5,100,219 A * | 3/1992 | Takahashi | 385/30 |
| 6,062,740 A * | 5/2000 | Ohtsuka et al. | 385/81 |
| 2003/0034963 A1 | 2/2003 | Moon et al. | |
| 2003/0208779 A1 | 11/2003 | Green et al. | |
| 2003/0234776 A1 * | 12/2003 | Konishi | 345/204 |

OTHER PUBLICATIONS

"Optical Graphic Extension Modules (M1-201-TR)." Optics Co., Ltd, Korea, www.optics.com, pp. 1.
DVI-X-Optical Extension System, Pacific Custom Cable Inc., USA, www.pacificable.com/DVI_Fiber_Extender_spec.html, pp. 2.

* cited by examiner

*Primary Examiner*—Rehana Perveen
*Assistant Examiner*—Jeremy S. Cerullo
(74) *Attorney, Agent, or Firm*—McDermott Will & Emery LLP

(57) ABSTRACT

An interface module for transmitting a digital video signal includes: a transmitting interface unit which is designed to be connected to a host device for outputting a video signal, and which has a cable connection consisting of a 4-core optical fiber cable and a 4-core male connector provided at one end thereof; a receiving interface unit having a cable connection designed to be connected to a video output display unit and consisting of a 4-core optical fiber cable and a 4-core male connector provided at one end thereof; and an optical cable unit for transmitting TMDS signals consisting of RGB signals and clock signals. The transmitting and receiving interface units are interconnected by the optical cable unit. The transmitting interface unit includes a second integrated circuit outputting identification information (DDC signal) associated with the video output display unit.

3 Claims, 5 Drawing Sheets

FIG. 4 (A)  Prior Art
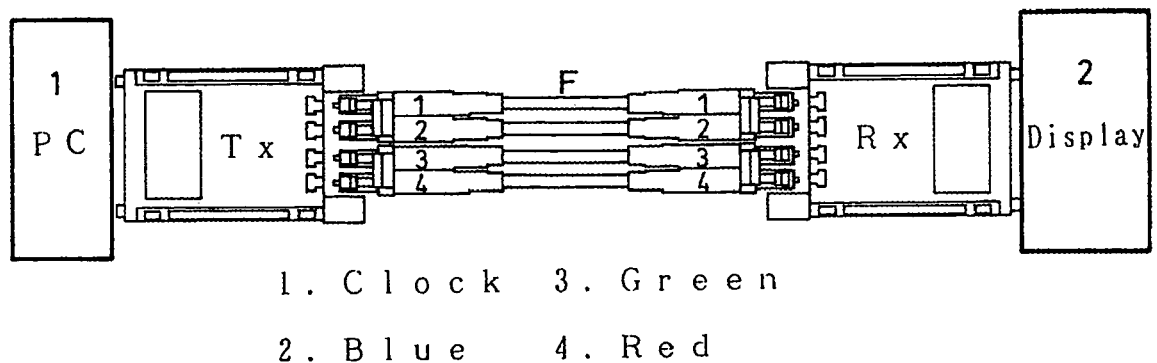
1. Clock  3. Green
2. Blue   4. Red
FIG. 4 (B)  Prior Art
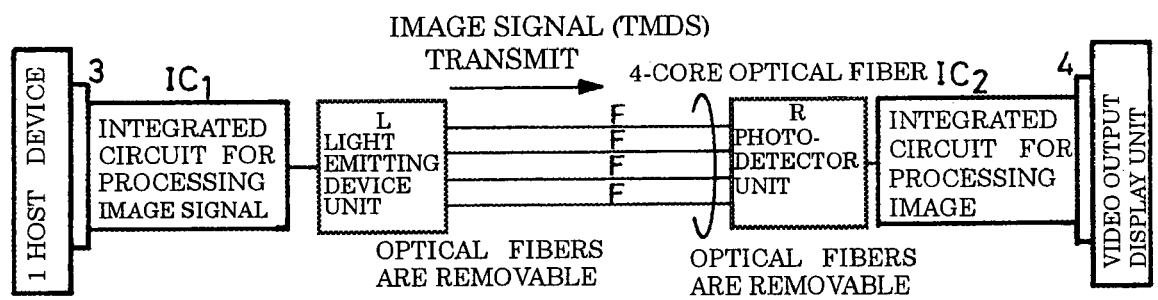
FIG. 4 (C)  Prior Art
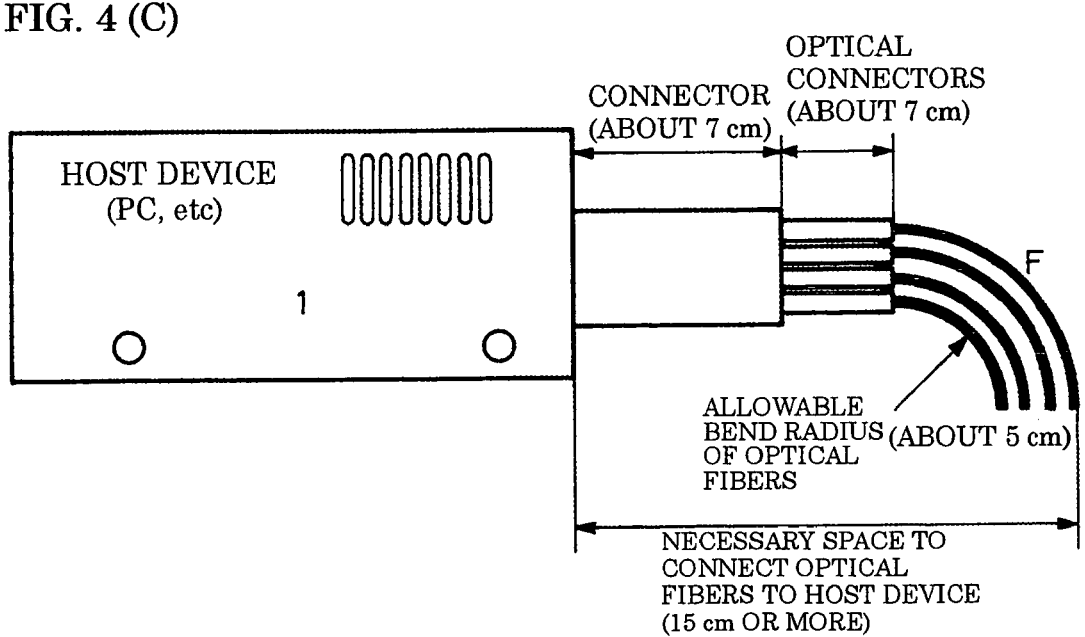

INTERFACE MODULE FOR TRANSMITTING DIGITAL VIDEO SIGNAL

BACKGROUND OF THE INVENTION

1. Field of the Invention

The present invention relates to an interface module in which an electrical-to-optical and optical-to-electrical converter (E/O and O/E converter) and an optical fiber line are used and which is suitable for achieving the long-distance transmission of digital video signals complying with the digital visual interface (DVI) standard.

2. Description of the Related Art

According to reduction in the thickness and increase in the size of video output display units such as plasma display panels (PDPs), liquid crystal displays (LCDs), full-page displays (FPDs), and projectors, such display units have become usable not only as television receivers, but also as, for example, display means for distributing information in advertising and medical fields, public transportation, factories, banks, etc.

Such a video output display unit is often separated from a host device that supplies a video signal (a video signal source, e.g., a personal computer (PC), a display controller, etc.).

When the video output display unit and the host device, which are separated from each other, are connected by a metal conducting cable, a video signal transmitted through the cable may be attenuated and/or reflected. This imposes a restriction on the length of the cable.

A method to solve this problem has been proposed in an interface module using optical fibers, as described in "Optics data sheet M1-201-TR (Ver. 0.9)".

Referring to FIG. 4A, this interface module includes a transmitting unit Tx connected to a host device (PC) 1, a receiving unit Rx connected to a video output display unit (Display) 2, and four optical fibers F connecting the host device 1 and the video output display unit 2.

Referring to FIG. 4B, the transmitting unit Tx includes an integrated circuit $IC_1$ for processing an image signal and a light emitting device unit L. The transmitting unit Tx connects to a digital visual interface (DVI) connector terminal 3 of the host device 1. The receiving unit Rx includes an integrated circuit $IC_2$ for processing an image signal and a photodetector unit R. The receiving unit Rx connects to a DVI connector terminal 4 of the video output display unit 2. The four optical fibers F, which are arranged in pairs, are attached to connectors so as to be removably connected to the transmitting and receiving units Tx and Rx. The four optical fibers F transmit four signals consisting of RGB signals and a clock signal, which comply with the transition minimized differential signals (TDMS) standard.

In the DVI, which is a proposed standard of an interface for connection with a digital display and electrically is based on the TMDS technology, a display data channel (DDC), which uses an expanded interface that enables the transmission of information from a display to a host device, can be used for identification of a display.

With these four signals, therefore, information cannot be transmitted from the video output display unit 2 to the host device 1, and consequently automatic setting (plug & play function) cannot be implemented. As a result, with this interface module, the identification of the video output display unit 2 cannot be achieved, and the display type and synchronization frequency must be set manually with the host device 1, which is burdensome.

It is conceivable to increase the number of optical fibers F so as to transmit DDC signal, thereby allowing application of plug & play function. In such a case, the transmitting unit Tx must include an additional photodetector unit, and the receiving unit Rx must also include an additional light emitting device unit. This may result in an increase in size and cost.

The optical fibers F have an allowable bend radius. Thus, a space of at least 15 cm is necessary to connect four optical fibers F to the host device 1 in the case where connectors are provided as shown in FIG. 4C. This imposes restrictions with respect to the position at which the interface module can be placed, which is disadvantageous in terms of user-friendliness of the interface module. The larger the number of optical fibers, the larger the space required, and hence the module becomes less user-friendly.

Thus, metal wires M may conceivably be used for DDC as shown in FIG. 5A. In this case, it is effective in terms of usability to use a composite cable H as shown in FIG. 5B, instead of using the metal wires M separated from the optical fibers F. The composite cable H shown in FIG. 5B consists of five metal wires and four optical fibers F. The metal wires M are connected directly to the DDC signal pins of DVI connector terminals 3 of the host device 1 and the DDC signal pins of DVI connector terminals 4 of the video output display unit 2.

With this arrangement, information (DDC signal) from the video output display unit 2 can be directly transmitted to the host device. Thus, it is unnecessary to provide the transmitting unit Tx with an additional photodetector unit, nor is it necessary to provide the receiving unit Rx with an additional light emitting device unit.

In the case of the composite cable, a video signal, which is transmitted through the optical fibers, is not attenuated much, allowing long-distance transmission without problems. On the other hand, in the DDC signal, which is an electrical signal transmitted through the metal wires, attenuation and waveform distortion due to reflection are observed when the transmission of the DDC signal exceeds a certain distance. This causes transmission errors, and the video output display unit cannot be accurately identified.

Since the above-described composite cable deals with an optical signal and an electrical signal, it requires time for termination treatment with a connector for the sake of the different kind of signals. In other words, the optical fibers of the composite cable must be coupled to optical (transmitting/receiving) devices of the connector, whereas the metal wires must be connected to terminal pins. Since different treatments of the termination must be performed, the termination work requires time, the structure of the connector becomes complicated, and the cost for the termination is increased. Also, since the cable size increases, a larger space is necessary for connecting the host device and the display unit.

Furthermore, since the composite cable has a complicated structure and requires a lot of time for termination work, the structure of a connector thereof becomes complicated and the cost is increased in a case where a extension cable is to be connected for extending the composite cable, for example.

SUMMARY OF THE INVENTION

Accordingly, it is an object of the present invention to enable long-distance transmission of video signals to be achieved without using such a composite cable as has the above-mentioned problems.

To achieve the foregoing object, according to the present invention, an interface module for transmitting digital video signals has a built-in display data channel (DDC) signal generator for outputting identification information associated with the video output display unit and comprises: a transmitting interface unit which includes a cable connection consisting of a 4-core optical fiber cable for transmitting RGB signals and clock signals and a 4-core male connector provided at one end thereof and which is to be attached to a digital visual interface (DVI) connector terminal of a host device for outputting video signals; a receiving interface unit which includes a cable connection consisting of a 4-core optical fiber cable and a 4-core male connector provided at one end thereof and which is to be attached to a DVI connector terminal of a video output display unit; and a 4-core optical cable unit consisting of a 4-core optical cable and 4-core female connectors provided at both ends thereof and designed to be engaged with the 4-core male connector of the respective cable connection of the transmitting and receiving interface units, wherein the length of the 4-core optical fiber cable of each of the cable connections is greater than or equal to one fourth of the circumference of a circle whose radius corresponds to an allowable bend radius of the 4-core optical fiber cable.

The above-described structure, in which the two interface units each include the cable connection having the 4-core male connector at one end of the cable thereof such that the cable can be bent to an allowable bend radius of the cable, allows reduction in the space needed for attaching the transmitting and receiving interface units to the host device and the video output display unit, respectively.

Since the cable includes only the 4-core optical fiber cable, installation work can be done easily. As the cable structure is simple, the structures of the connectors are also simple and the manufacturing cost thereof can be reduced.

Since the transmitting interface unit generates a DDC signal serving as the identification information, the transmission of digital-video-signals according to the DVI standard is possible with the transmission of a TMDS image signal by means of the 4-core optical fiber cable, and plug & play can be achieved.

The transmitting interface unit may be equipped with a switching means so that the DDC signal generator is caused to output identification information corresponding to a plurality of video output display units by switching the switching means.

With this structure, in which a video output display unit is connected to a host device, the identification information output from the DDC signal generator to the host device can be changed to equivalent identification information by switching the switching means of the transmitting interface unit when the identification information must be changed in accordance with the specifications of the video output display unit (e.g., output resolution). In such a case, by switching the switching means of the transmitting interface unit, the identification information output from the DDC signal generator to the host device is changed to equivalent identification information.

In such case, the DDC signal generator in the transmitting interface unit may be an integrated circuit that generates a signal equivalent to a DDC signal.

With this structure, DDC signals in accordance with a plurality of video output display units can be generated by storing the identification information in the integrated circuit.

Thus, the present invention having the above-described structure makes it possible to achieve the long-distance transmission of video signals.

BRIEF DESCRIPTION OF THE DRAWINGS

FIG. 4A is a front view of a conventional interface module using optical fibers;

FIG. 4B is a block diagram of the conventional interface module;

FIG. 4C illustrates the state of conventional connection between a host device having a connector and optical fibers having optical connectors;

DESCRIPTION OF THE PREFERRED EMBODIMENTS

Figure 1:
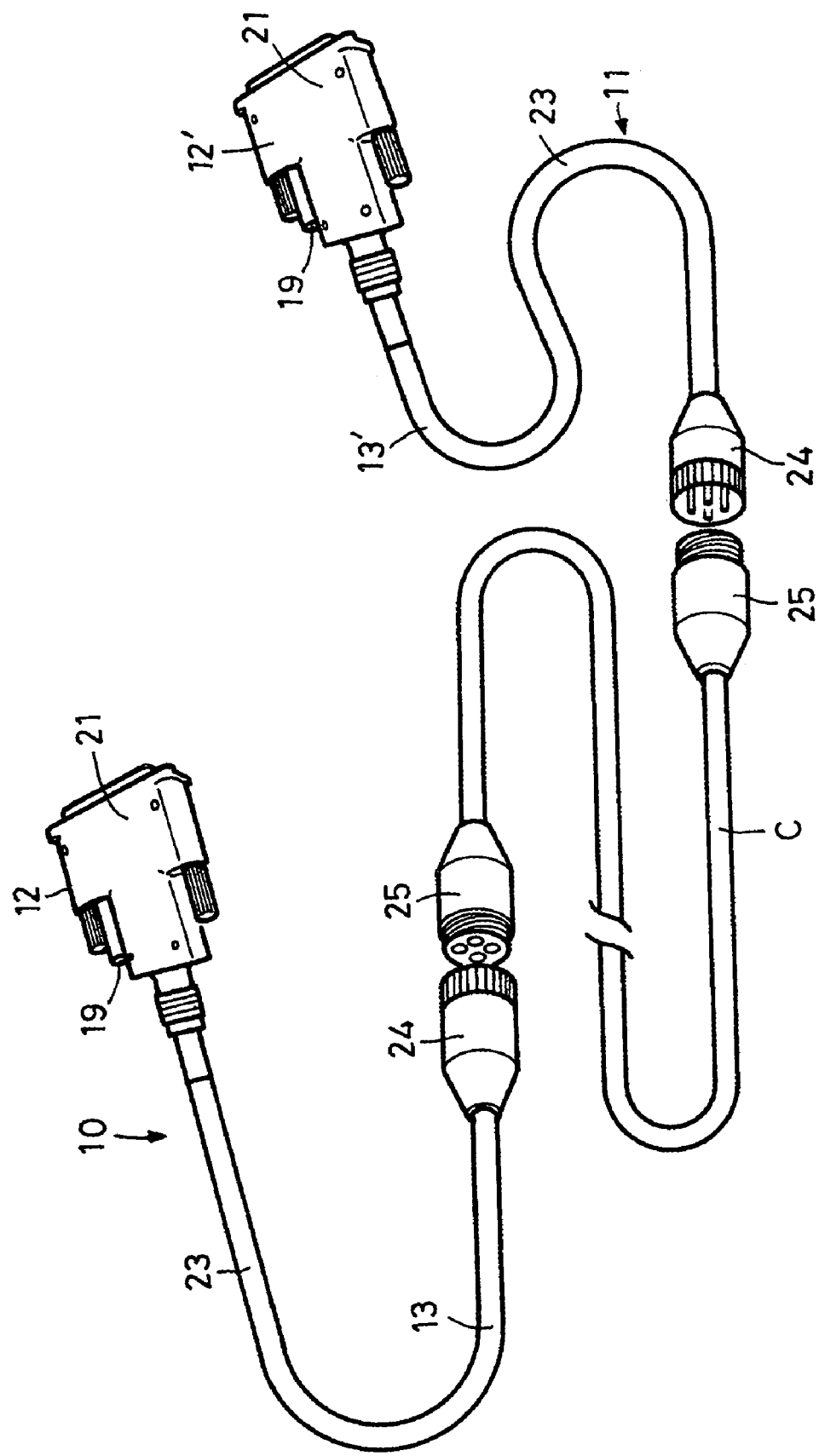
FIG. 1 is a perspective view of an interface module for transmitting a digital video signal according to an embodiment of the present invention.

With reference to the accompanying drawings, embodiments of the present invention will now be described. The same reference numerals are used to refer to the same components, and repeated descriptions of common portions are omitted. The scale of the drawings does not necessarily agree with that of the description.

Referring to FIG. 1, an interface module for transmitting a digital video signal of this embodiment includes a transmitting interface unit 10, a receiving interface unit 11, and an optical cable unit C connecting these interface units 10 and 11.

Figure 2:
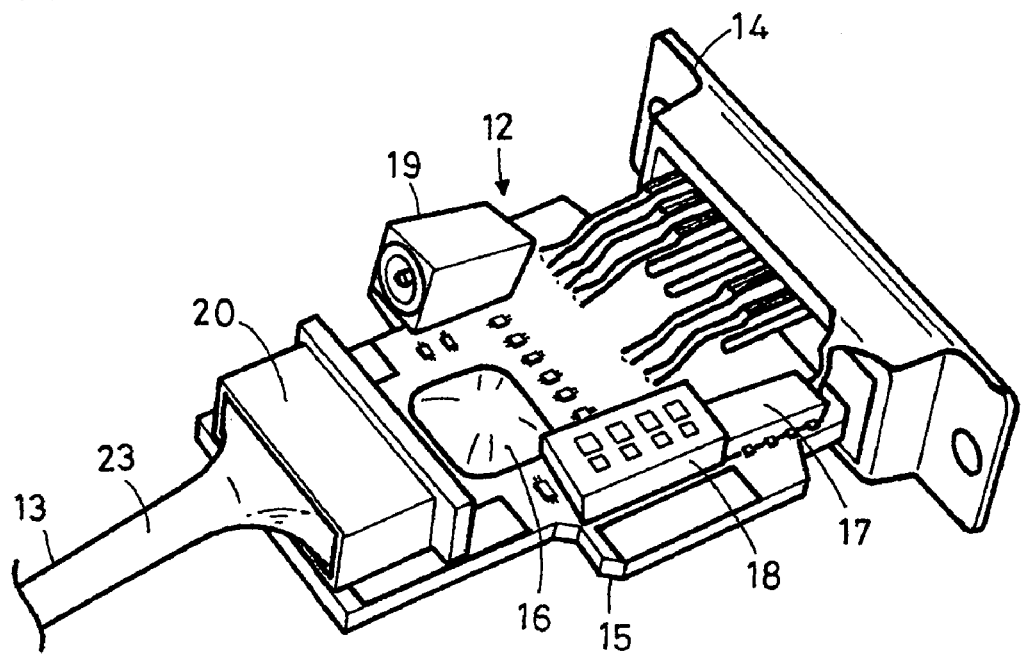
FIG. 2A is a perspective view of a DVI connector of a transmitting interface unit shown in FIG. 1.
FIG. 2B is a perspective view of a DVI connector of a receiving interface unit shown in FIG. 1.
Figure 2:
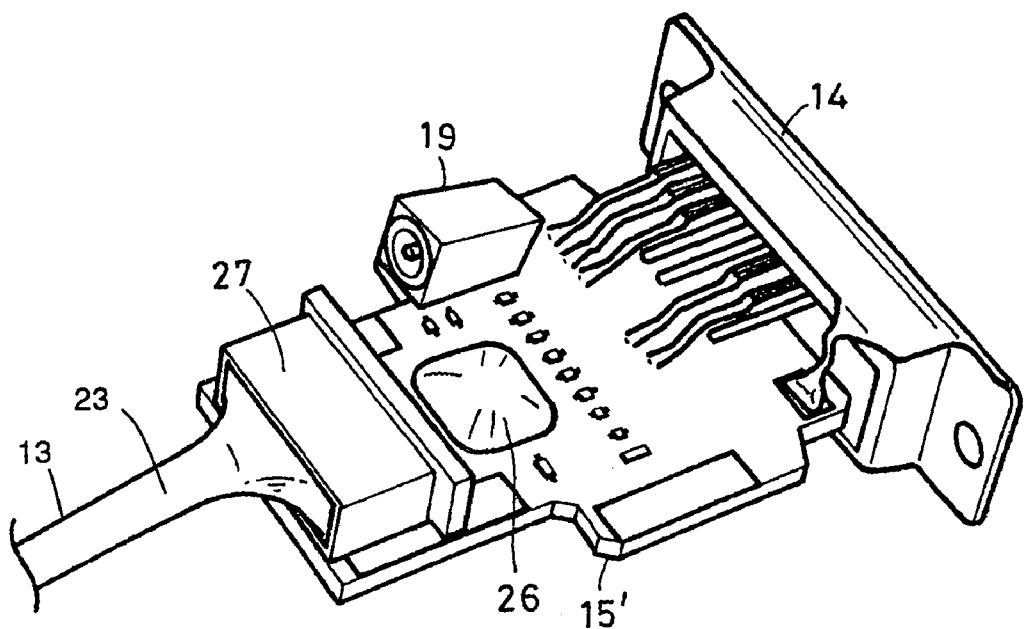

The transmitting interface unit 10 includes a connector 12 and a cable connection 13. Referring to FIG. 2A, the connector 12 has a structure such that integrated circuits 16 and 17, a selector switch 18, an external power terminal 19, and a light emitting device unit 20 are disposed on a circuit board 15 provided with a DVI connector 14, and the connector 12 is enclosed in a resin cover 21 as shown in FIG. 1. The light emitting device unit 20 is integrated with the cable connection 13.

Figure 3:
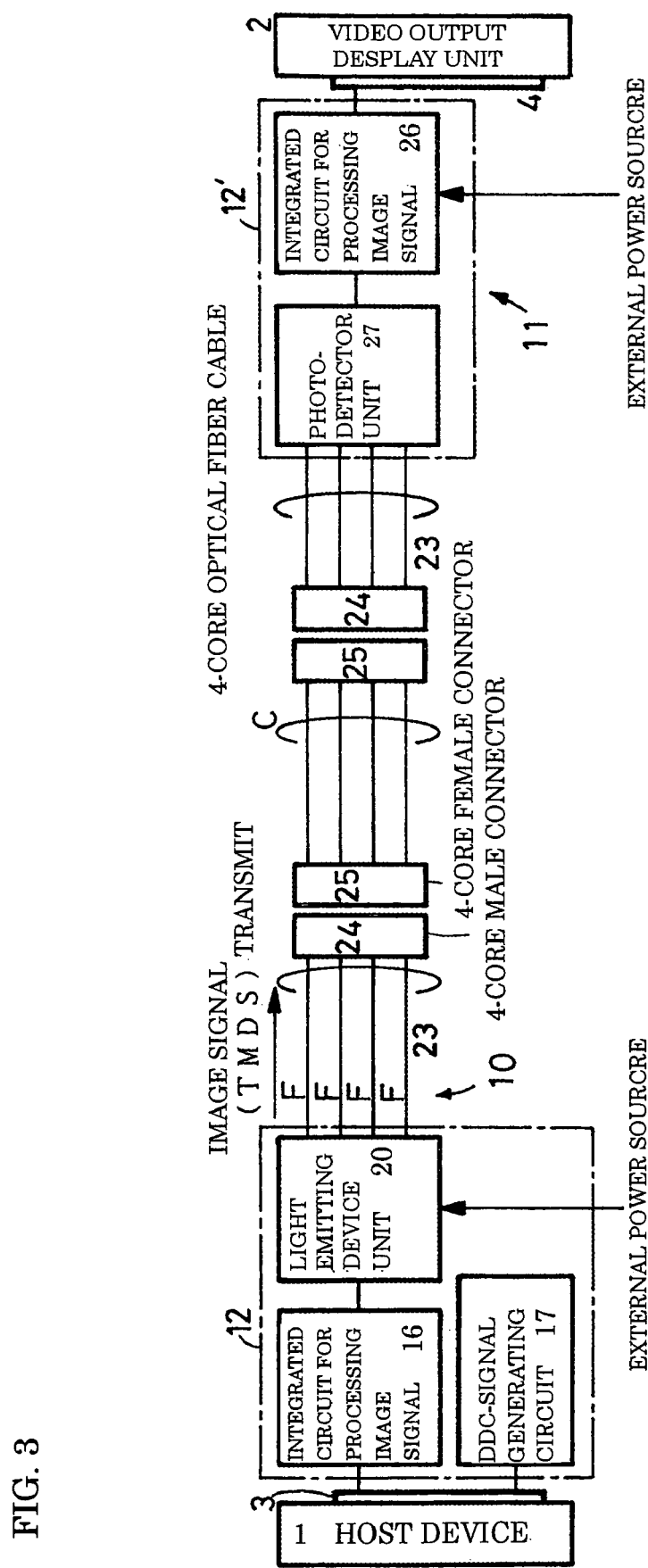
FIG. 3 is a block diagram of the interface module shown in FIG. 1.
Figure 5:
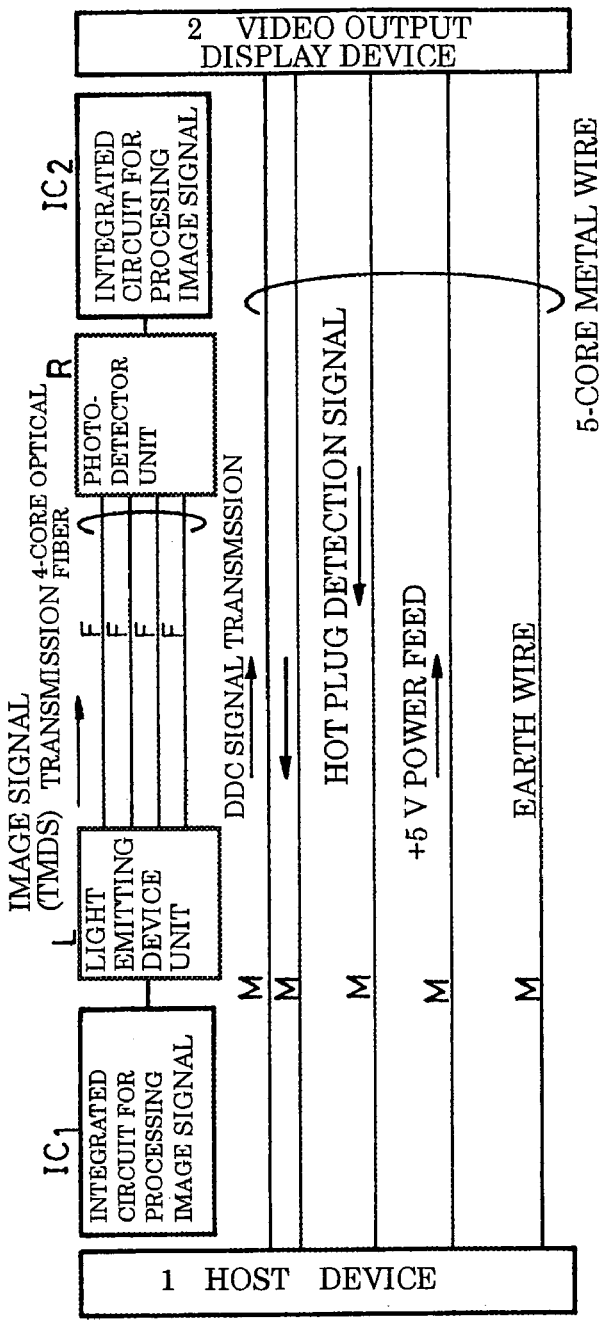
FIG. 5A is a block diagram of another conventional interface module.
FIG. 5B is a sectional view of a composite cable for use in this conventional interface module.
Figure 5:
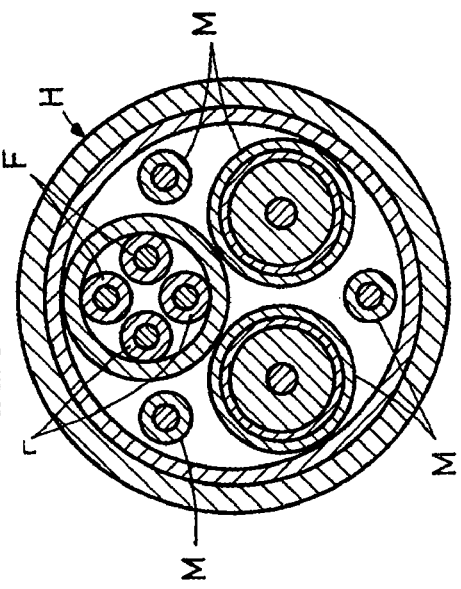

The DVI connector 14 is, for example, a 24-pin connector. Referring to FIG. 3, the DVI connector 14 is attached to a video-output DVI connector terminal 3 of a host device (e.g., a PC)) 1.

The integrated circuits 16 and 17 consist of first and second integrated circuits 16 and 17. The first integrated circuit 16, which is an integrated circuit for processing image signals, converts digital video signals (TMDS image signals consisting of RGB signals and dock signals) received from the DVI connector 14 into flicker signals for driving the light emitting device unit 20.

The second integrated circuit 17 is provided as a means for generating a pseudo identification signal (DDC signal) associated with a video output display unit 2. Basically, the DDC signal of the second integrated circuit 17 is transmitted from the video output display unit (e.g., an LCD for a PC, a PDP for exhibition, and a display with a DVI input terminal) 2 to a host device (video signal. source, e.g., a PC) 1 for identifying the video output display unit 2. On the basis of the transmitted DDC signal, the host device 1 identifies the video output display unit 2 or performs automatic setting (plug & play function) of the display type, synchronization frequency, etc.

According to this embodiment, the second integrated circuit 17 can generate pseudo-patterns of DDC signals of a plurality of types of video output display units. The DDC signal pattern is selected by the selector switch 18.

According to this embodiment, the selector switch 18 is a DIP switch. Depending on the ON and OFF combinations of switch levers, the selector switch 18 can select many DDC signals.

The external power terminal 19 is provided to use an external power source (e.g., an AC adapter), instead of using power fed from the host device 1. When the external power terminal 19 is connected to a power connector, the power source is automatically switched to the external power source.

The light emitting device unit 20 includes a set of four light emitting diodes (LEDs). According to this embodiment, for example, the light emitting device unit 20 is connected via a coupler to a 4-core optical fiber cable 23 of the cable connection 13. The cable connection 13 includes, as shown in FIG. 1, the 4-core optical fiber cable 23 and a 4-core male connector 24 attached to one end of the 4-core optical fiber cable 23. The length of the 4-core optical fiber cable 23 is greater than or equal to one fourth of the circumference of a circle whose radius corresponds to an allowable bend radius of the 4-core optical fiber cable 23. The 4-core male connector 24 is connected to one of the two 4-core female connectors 25 of the optical cable unit C. As a result, the degree of bending freedom of the cable connection 13 is greatly improved.

The optical cable unit C includes the 4-core optical fiber cable 23 and the two 4-core female connectors 25 disposed at both ends of the 4-core optical fiber cable 23. One connector 25 is connected to the transmitting interface unit 10, whereas the other connector 25 is connected to the receiving interface unit 11.

The receiving interface unit 11 includes a connector 12' and a cable connection 13'. The connector 12' is structured such that as shown in FIG. 2B, an integrated circuit 26, an external power terminal 19, and a photodetector unit 27 are disposed on a circuit board 15' provided with a DVI connector 14, and a resin cover 21 is attached as shown in FIG. 1. The photodetector unit 27 is integrated with the cable connection 13'.

The DVI connector 14, which is the same as that of the transmitting interface unit 10, is connected to a video-signal-input DVI connector terminal 4 of the video output display unit 2.

The integrated circuit 26, which is a third integrated circuit for processing an image signal, converts an optical signal detected by the photodetector unit 27 into a digital video signal.

The external power terminal 19 is provided to use an external power source (e.g., an AC adapter), instead of using power fed from the video output display unit 2. When the external power terminal 19 is connected to a power connector, the power source is automatically switched to the external power source.

The photodetector unit 27 includes a set of four photodetectors (e.g., PIN photodetector). According to this embodiment, for example, the photodetectors are connected via a coupler to fibers F of a 4-core optical fiber cable 23 of the cable connection 13'.

The cable connection 13', which is of the same type as that of the transmitting interface unit 10, includes the 4-core optical fiber cable 23 and a 4-core male connector 24 attached to one end of the 4-core optical fiber cable 23. The 4-core optical fiber cable 23 has a length which is greater than or equal to one fourth of the circumference of a circle whose radius corresponds to the allowable bend radius of the 4-core optical fiber cable 23 so that the degree of bending freedom is improved for connecting it to the other 4-core female connector 25 of the optical cable unit C.

The interface module according to this embodiment is structured as described above such that the transmitting interface unit 10 of the interface module is to be attached to the DVI connector terminal 3 of the host device 1 and the receiving interface unit 11 is to be attached to the DVI connector terminal 4 of the video output display unit 2.

The transmitting interface unit 10 is provided with the selector switch 18 so as to output a pseudo-DDC signal that is in compliance with the video output display unit 2.

The 4-core male connector 24 of the cable connection 13 of the transmitting interface unit 10 and the 4-core male connector 24 of the cable connection 13' of the receiving interface unit 11 are connected to the 4-core female connectors 25, respectively, of the optical cable unit C.

The connection between the optical cable unit C and the interface units 10 and 11 is done, as shown in FIG. 1, by the cable connections 13 and 13', which are distanced from the connectors 12 and 12' of the interface units 10 and 11. The cable connections 13 and 13' have a structure in which the 4-core male connectors 24 are attached respectively to one end of the respective 4-core optical fiber cables 23 of the transmitting and receiving interface units 10 and 11. The cable connections 13 and 13' do not have conventional connectors to connect with the interface units 10 and 11, respectively. Since the length of the 4-core optical fiber cable 23 of each of the cable connections 13 and 13' is greater than or equal to one fourth of the circumference of a circle whose radius corresponds to the allowable bend radius of the 4-core optical fiber cable 23, the directions of the cable connections 13 and 13' can be changed by 90 degrees. For example, attaching the transmitting interface. unit 10 and the receiving interface unit 11 to the host device 1 and the video output display unit 2, respectively, requires only a small space to bend the 4-core optical fiber cables 23 even when the 4-core optical fiber cables 23 are bent to the allowable bending radius. That is, the necessary space is reduced by at least a portion corresponding to the connectors as compared with a conventional method.

Since the cable of the optical cable unit C includes only the 4-core optical fiber cable 23, the installation work is simple. Moreover, the simple cable structure allows the connectors 24 and 25 to have simple structures and to be manufactured at reduced cost accordingly.

When the optical cable unit C is connected, the transmitting interface unit 10 and receiving interface unit 11 are interconnected by the 4-core optical fiber cables 23 such that TMDS image signals consisting of RGB signals and dock signals can be transmitted from the host device 1 to the video output display unit 2.

The second integrated circuit 17 serving as DDC signal generating means of the transmitting interface unit 10 generates a pseudo-DDC signal as identification information and outputs the pseudo-DDC signal via the DVI connector 14 to the host device 1 so that the host device 1 can identify the video output display unit 2 thanks to the pseudo-DDC signal. On the basis of identification information, the video output display unit 2 outputs signals. Therefore, with the transmission of the TMDS image signal by means of the 4-core optical fiber cable 23, digital-video-signal transmission complying with the DVI standard can be implemented, and plug & play function can be achieved.

Thus, the DDC signal can be supplied to the host device 1 without using a composite cable, and consequently long-distance transmission of video signals can be achieved.

Although a case in which the optical fiber cable is directly connected to the optical module units has been described in this embodiment, the present invention is not limited to this case. The optical module may be structured such that the optical fibers are removably attached to the optical module units by means of optical connectors as in a conventional interface module shown in FIG. 4.

What is claimed is:

1. An interface module for transmitting a digital video signal comprising:
    a transmitting interface unit having (1) a first 4-core optical fiber cable, (2) a first 4-core male optical connector provided at one end thereof, and (3) a first digital visual interface (DVI) connector provided at another end thereof, said first DVI connector including a light emitting device unit converting RGB signals and clock signals from electrical to optical signals and a built-in display data channel (DDC) signal generating means for outputting identification information associated with a video output display unit and being attached to a first DVI connector terminal of a host device outputting a video signal;
    a receiving interface unit having (1) a second 4-core optical fiber cable, (2) a second 4-core male optical connector provided at one end thereof, and (3) a second DVI connector provided at another end thereof, said second DVI connector including a photo detector unit converting RGB signals and clock signals from optical to electrical signals and being attached to a second DVI connector terminal of a video output display unit; and
    a 4-core optical cable unit consisting of (1) a third 4-core optical cable and (2) 4-core female optical connectors provided at both ends thereof, the 4-core female optical connectors designed to be engaged with the first and second 4-core male optical connectors,
    wherein each of the lengths of the first and second 4-core optical fiber cable is greater than or equal to one fourth of the circumference of a circle whose radius corresponds to an allowable bend radius of the first and second 4-core optical fiber cable.

2. An interface module according to claim 1, wherein the transmitting interface unit includes switching means for causing the DDC signal generating means to output identification information associated with a plurality of video output display units when the switching means is switched.

3. The interface module according to claim 1, wherein the DDC signal generating means comprises an integrated circuit that generates a signal equivalent to a DDC signal.

* * * * *